July 16, 1935.   L. BLACKMORE ET AL   2,008,169
CLUTCH PLATE
Filed March 23, 1932
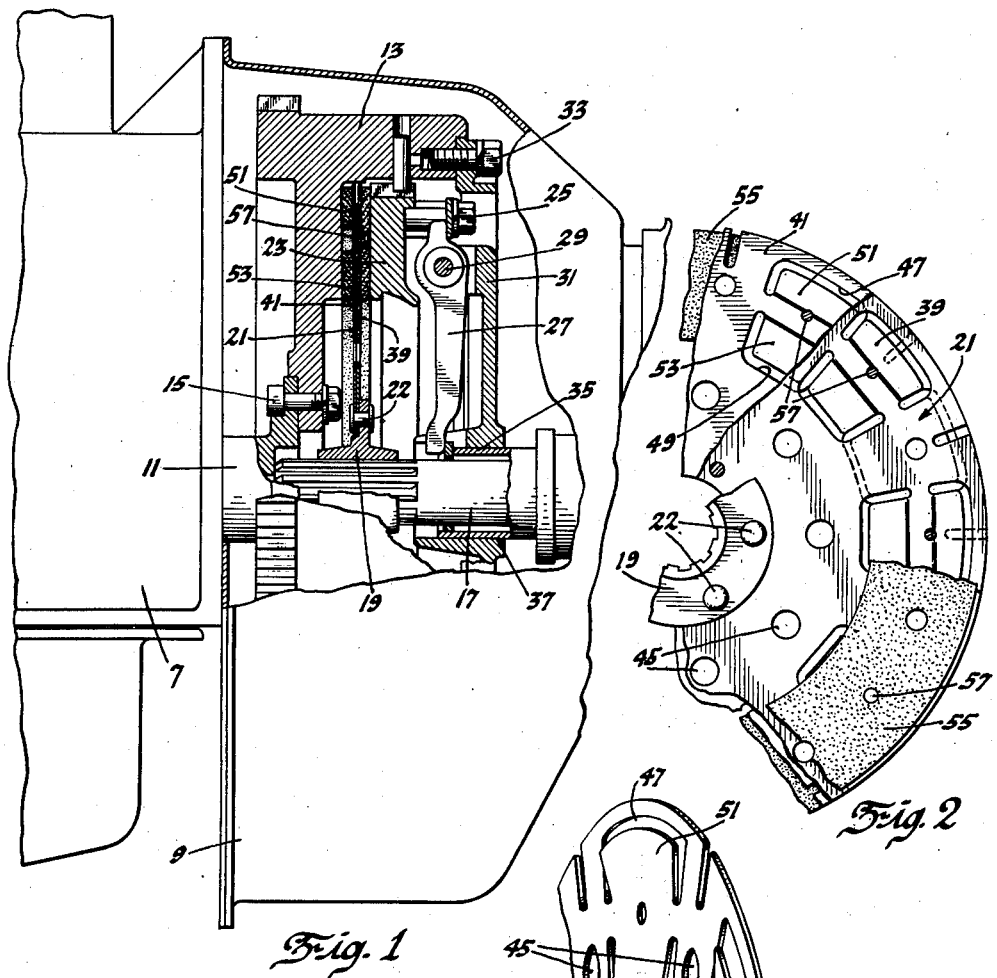
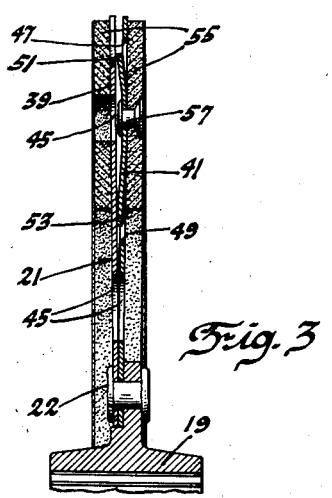
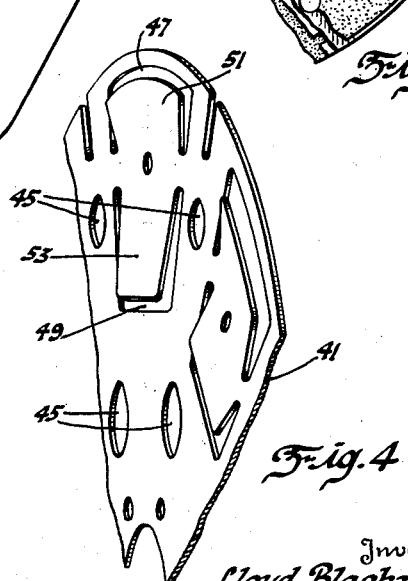
Inventors
Lloyd Blackmore &
Robert R. Hutchison
By Blackmore, Spencer & Flint
Attorneys

UNITED STATES PATENT OFFICE 2,008,169

CLUTCH PLATE

Lloyd Blackmore, Detroit, and Robert R. Hutchison, Pontiac, Mich., assignors to General Motors Corporation, Detroit, Mich., a corporation of Delaware Application March 23, 1932, Serial No. 600,664

2 Claims. (Cl. 192—107)

This invention relates to clutches and has been designed more particularly as an improved clutch for motor vehicles.

An object of the invention is to provide a construction which will improve the action of the clutch, which will insure gradual engagement and which will prevent grabbing.

Other objects such as simplicity and economy are attained by the novel structure.

Still other advantages will be understood from the following description.

In the accompanying drawing—

Fig. 1 shows in elevation a clutch housing, the housing being broken away and the clutch elements being shown in section.

Fig. 2 is a plan view of the driven plate, partly broken away.

Fig. 3 is a section through the hub and driven plate.

Fig. 4 is a perspective of a part of one of the driven plate elements.

Referring by reference characters to the drawing, numeral 7 designates an engine of the motor vehicle and 9 is the clutch housing. The end of the engine crankshaft is shown at 11 and numeral 13 represents the flywheel secured to the crankshaft by fastening means 15. The driven shaft is represented by numeral 17. At its end adjacent the flywheel it is splined to receive a hub 19. Numeral 21 represents the driven plate as a whole. The hub is non-rotatably mounted on the splined end of the driven shaft 17 and is secured to the driven plate 21 by fastening means 22. 23 represents a substantially conventional pressure plate. 25 is an abutment carried by pressure plate 23 and engaged by the end of a finger 27 which is pivoted at 29 to a cover plate 31, the latter being fastened to the flywheel 13 as at 33. The finger 27 is reciprocated by a sleeve 35 slidable axially of the driven shaft and, in the embodiment illustrated, guided by an opening 37 in the cover plate 31.

The conventional lever for reciprocating the collar 35 is not illustrated nor is the spring means for normally forcing the pressure plate toward the flywheel face.

The invention is concerned with the structure of the driven plate 21. This plate is formed from two discs 39 and 41. The metal of the discs may be reduced by cutting holes, some of which are designated by numeral 45, to reduce the weight of the discs and increase their resiliency. Each disc is cut along U-shaped lines as at 47 and 49, and tongues 51 and 53 are bent up from the plane of the disc as shown in Fig. 4. It will be obvious that if preferred openings may be cut from the disc and the tongues may be separate elements secured to the discs and extending from the planes of the disc and designed to be flattened into the openings of the disc. However, it is believed to be preferable to construct the tongues by bending them from the plane as shown in Fig. 4. It will be seen that there are a series of tongues 51 and a second series 53. The tongues of each series are spaced apart as shown in Fig. 2 and Fig. 4. The tongues of each disc are deflected radially, the tongues of the outer series being extended radially outward and the tongues of the inner series extending radially inward from what may be termed a common base line. The two discs are assembled in such a way that the tongues extend in each case toward the adjacent disc, and the discs are circumferentially positioned so that the tongues of one disc extend between the tongues of the other. This is perhaps best shown by the full and dotted lines of Fig. 2.

Upon the remote faces of the two discs are employed linings 55 secured by fastening means 57. By this construction it will be seen that the discs constituting the clutch plate afford flat faces for the support of the linings.

The provision of these tongues causes the driven plate to assume the position shown by Fig. 3 when not under pressure. When in action the tongues are depressed into the planes of their respective discs by pressure from the flat surfaces of the opposing discs. A smooth gradual engagement of the clutch is thus insured. One important advantage of this invention is that it affords a flat surface for the support of both the friction linings, while at the same time providing for the yielding engagement of the clutch elements.

We claim:

1. In a clutch, a driven plate, said plate comprising a pair of discs, tongues extending from the plane of each disc and extending toward the adjacent disc, each disc having two series of such tongues, the tongues of one series extending radially outward from a base line and the tongues of the other series extending radially inward from said base line.

2. The invention defined by claim 1, the tongues of each disc engaging the flat face of the other disc between the tongues thereof.

LLOYD BLACKMORE.
ROBERT R. HUTCHISON.